United States Patent
Takahashi et al.

(10) Patent No.: US 10,972,964 B2
(45) Date of Patent: Apr. 6, 2021

(54) COMMUNICATION DEVICE, SCANNER TERMINAL, COMMUNICATION SYSTEM, COMMUNICATION METHOD, AND STORAGE MEDIUM

(71) Applicant: Casio Computer Co., Ltd., Tokyo (JP)

(72) Inventors: Toshihiro Takahashi, Kunitachi (JP); Takahiro Tomida, Hamura (JP); Tsutomu Terazaki, Saitama (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 16/520,065

(22) Filed: Jul. 23, 2019

(65) Prior Publication Data
US 2020/0037229 A1    Jan. 30, 2020

(30) Foreign Application Priority Data

Jul. 30, 2018 (JP) .............................. JP2018-142857

(51) Int. Cl.
*H04B 7/00* (2006.01)
*H04W 48/10* (2009.01)
*H04W 4/80* (2018.01)
*H04W 4/06* (2009.01)

(52) U.S. Cl.
CPC ............. *H04W 48/10* (2013.01); *H04W 4/06* (2013.01); *H04W 4/80* (2018.02)

(58) Field of Classification Search
CPC .......... H04W 48/10; H04W 4/80; H04W 4/06
See application file for complete search history.

(56) References Cited

U.S. PATENT DOCUMENTS

| | | | |
|---|---|---|---|
| 2005/0203797 A1* | 9/2005 | Isobe ................ | G06Q 30/0241 705/14.31 |
| 2015/0256968 A1 | 9/2015 | Terazaki et al. | |
| 2016/0278011 A1 | 9/2016 | Tomida | |
| 2018/0124731 A1* | 5/2018 | Klotchkov ............... | H04L 7/02 |

FOREIGN PATENT DOCUMENTS

| | | |
|---|---|---|
| JP | 2012-142877 A | 7/2012 |
| JP | 2015-008368 A | 1/2015 |
| JP | 2015-170937 A | 9/2015 |

* cited by examiner

*Primary Examiner* — Tuan Pham
(74) *Attorney, Agent, or Firm* — Seed IP Law Group LLP (57) ABSTRACT

A communication device, including:
a communicator that communicates with a terminal that broadcasts an advertisement and broadcasts to a scanner terminal that receives data from the terminal; and
a controller that controls the communicator to transmit, to the terminal, data that is included in an advertisement that is scheduled to be broadcast by the terminal and transmission information regarding the advertisement and cause the communicator to broadcast the transmission information that is intended to cause the scanner terminal to receive the advertisement that is broadcast by the terminal.

13 Claims, 11 Drawing Sheets

| Sync Packet Offset (13bit) | Offset Units (1bit) | RFU (2bit) | Interval (2octet) | ChM (37bit) | SCA (3bit) | AA (4octet) | CRCInit (3octet) | EventCounter (2octet) |

| CODE | INFORMATION THAT PRESENTS SUMMARY OF DATA |
|---|---|
| 0101 | FOOD VEGETABLES |
| 0102 | FOOD MEAT |
| 0201 | CLOTHES FOR CHILDREN |
| 0202 | CLOTHES FOR WOMEN |
| 0203 | CLOTHES FOR MEN |
| ... | ... |

FIG. 12

COMMUNICATION DEVICE, SCANNER TERMINAL, COMMUNICATION SYSTEM, COMMUNICATION METHOD, AND STORAGE MEDIUM

CROSS-REFERENCE TO RELATED APPLICATION

This application claims the benefit of Japanese Patent Application No. 2018-142857, filed on Jul. 30, 2018, the entire disclosure of which is incorporated by reference herein.

FIELD

The present disclosure relates to a communication device, a scanner terminal, a communication system, a communication method, and a storage medium.

BACKGROUND

Unexamined Japanese Patent Application Kokai Publication No. 2012-142877 discloses a widely used technique in which broadcasting advertisement packets intermittently at given intervals in order for a slave device to be found by the master device in the Bluetooth (registered trademark) Low Energy (BLE), which is one of the near field communication standards.

The conventional BLE allows advertising data of up to 31 bytes to be carried in an advertisement packet. The new version (Bluetooth 5), which was released in December of 2016, allows advertising data of up to 254 bytes to be carried in an advertisement packet. Using the periodic advertising and the secondary advertising, which are additional functions of the Bluetooth 5, allows for periodic transmission of a large volume of data without establishing connection. The cycle of the periodic advertising is prescribed so that a relatively long cycle from 7.5 ms to 81.91875 s can be set. However, it is required for receiving the secondary advertising to receive an advertisement of the type ADV_EXT_IND that is preliminarily transmitted on the primary channel. However, if there is a terminal around that is advertising, it is highly possible that crosstalk prevents proper reception of the advertisement on the primary channel that is required for receiving the periodic advertising. Consequently, there is the risk of lowering the probability of proper reception of the periodic advertising.

SUMMARY

In order to attain the above-mentioned objective, a communication device includes a communicator that communicates with a terminal that broadcasts an advertisement and broadcasts to a scanner terminal that receives data from the terminal; and a controller that controls the communicator to transmit, to the terminal, data that is included in an advertisement that is scheduled to be broadcast by the terminal and transmission information regarding the advertisement, and cause the communicator to broadcast the transmission information that is intended to cause the scanner terminal to receive the advertisement that is broadcast by the terminal.

BRIEF DESCRIPTION OF THE DRAWINGS

A more complete understanding of this application can be obtained when the following detailed description is considered in conjunction with the following drawings, in which.

DETAILED DESCRIPTION

An embodiment will be described below based on the drawings.

Figure 1:
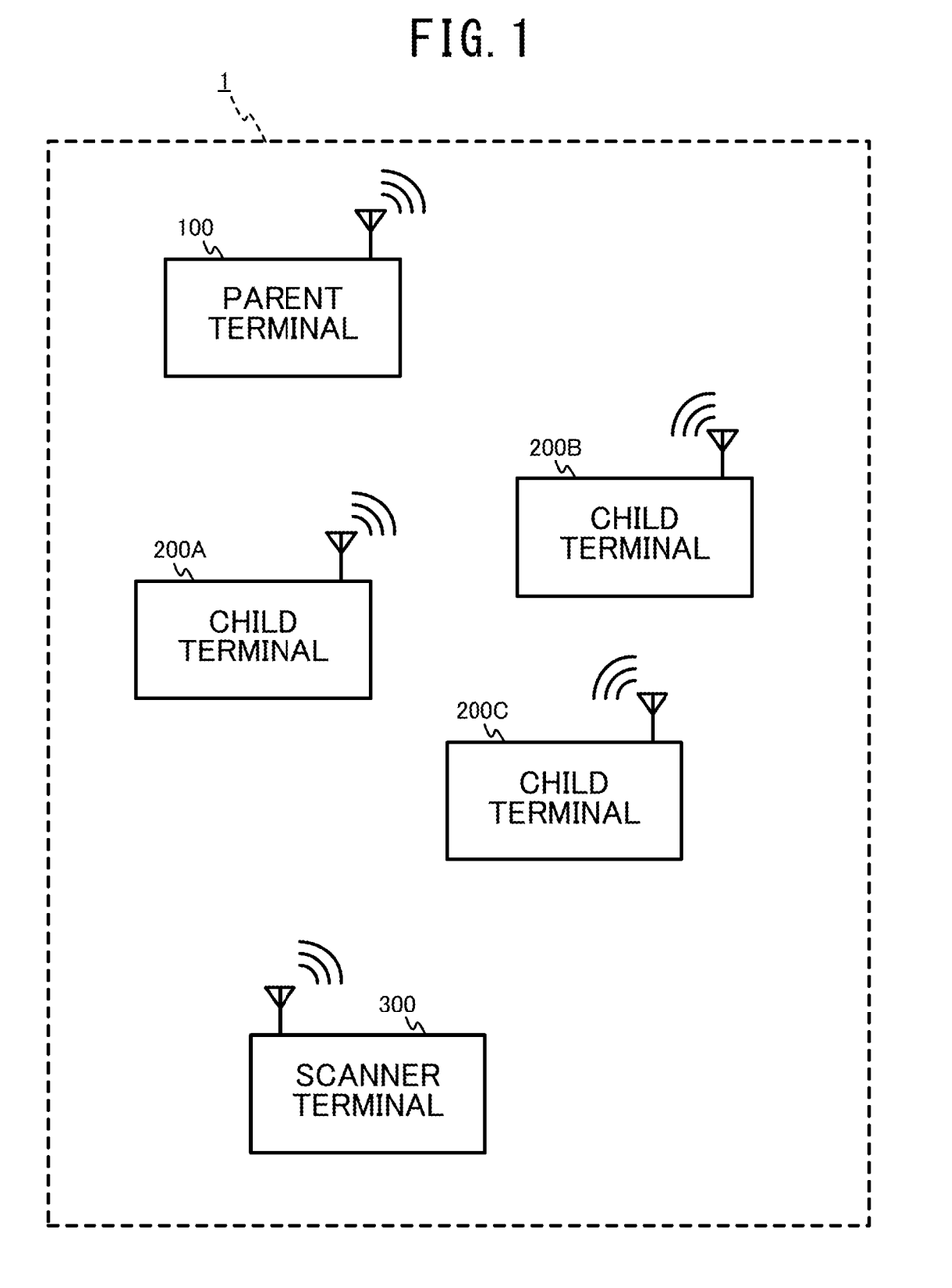
FIG. 1 is an illustration that shows an exemplary configuration of the communication system according to an embodiment.

A communication system 1, according to an embodiment, comprises, as shown in FIG. 1, a parent terminal (communication device) 100, child terminals (terminals) 200A to 200C, and a scanner terminal 300. The parent terminal 100, the child terminals 200A to 200C, and the scanner terminal 300 communicate with each other based on the Bluetooth (registered trademark) Low Energy (BLE, hereafter). The BLE is a standard (mode) that is designed for the purpose of low energy consumption in the near field communication standard that is called the Bluetooth. Furthermore, in this embodiment, it is assumed that the parent terminal 100, the child terminals 200A to 200C, and the scanner terminal 300 operate in compliance with the specification of the Bluetooth 5. In this embodiment, the parent terminal 100 transmits to the child terminals 200A to 200C and broadcasts to the scanner terminal 300 information regarding advertisements that will be described later. The child terminals 200A to 200C broadcast advertisement packets based on the information regarding advertisements that is received from the parent terminal 100. The scanner terminal 300 receives the advertisement packets that are transmitted by the parent terminal 100 based on the information that is received from the parent terminal 100.

Figure 2:
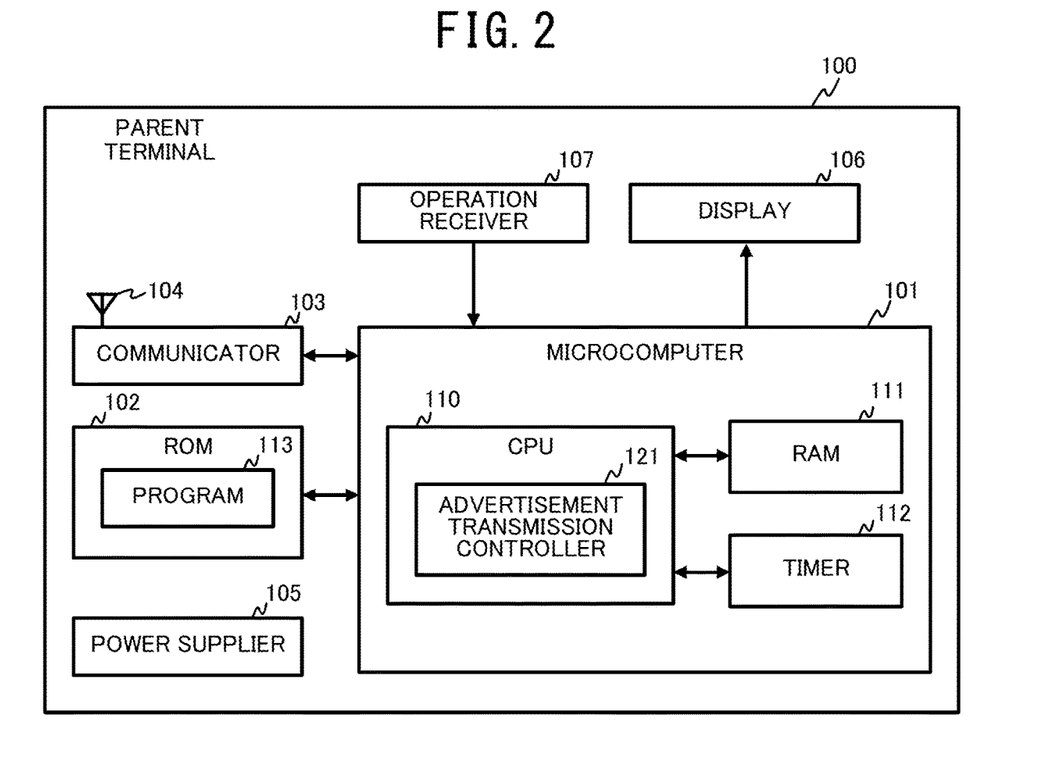
FIG. 2 is a block diagram that shows the configuration of the parent terminal of the embodiment.

Next, the hardware configuration of the parent terminal 100, according to the embodiment, will be described. The parent terminal 100 comprises, as shown in FIG. 2, a microcomputer 101, a read only memory (ROM) 102, a communicator 103, an antenna 104, a power supplier 105, a display 106, and an operation receiver 107.

The microcomputer 101 comprises a central processing unit (CPU) 110 as a controller, a random access memory (RAM) 111 as a storage, and a timer 112. Here, the RAM 111 and the timer 112 are not necessarily provided within the microcomputer 101 and may be provided outside the microcomputer 101. Moreover, the ROM 102, the communicator 103, the antenna 104, and the power supplier 105 are not necessarily provided outside the microcomputer 101 and may be provided within the microcomputer 101.

The CPU 110 is a processor that performs various arithmetic operations that collectively control the entire operation of the parent terminal 100. The CPU 110 reads control programs from the ROM 102 and loads the programs onto the RAM 111 to perform various operation processing such as arithmetic operation controls and displays regarding various functions. Moreover, the CPU 110 controls the communicator 103 to perform data communication with the child terminals 200A to 200C and the scanner terminal 300.

The RAM 111 is a volatile memory such as a static random access memory (SRAM) and a dynamic random access memory (DRAM). The RAM 111 stores various setting data.

The timer 112 comprises an oscillation circuit, a frequency dividing circuit, a timer circuit, and the like and is capable of keeping the current time and clock-synchronizing with other communication devices.

The ROM 102 is a nonvolatile memory or the like and stores control programs and initial setting data. The control programs include a program 113 regarding control over various processing for controlling communication with the child terminals 200A to 200C and the scanner terminal 300.

The communicator 103 comprises, for example, a radio frequency (RF) circuit, a baseband (BB) circuit, and a memory circuit. The communicator 103 demodulates, decodes, and sends to the CPU 110 radio signals that are received via the antenna 104. Moreover, the communicator 103 encodes, modulates, and transmits outside via the antenna 104 signals that are sent by the CPU 110. In this embodiment, the communicator 103 is realized by a Bluetooth controller that transmits and receives radio signals based on the BLE.

The power supplier 105 comprises, for example, a battery and a voltage conversion circuit. The power supplier 105 supplies power at an operation voltage of the parts within the parent terminal 100. As the battery of the power supplier 105, for example, a primary battery such as a button-type dry-cell battery or a secondary battery such as a lithium-ion battery is used.

The display 106 comprises, for example, a display panel such as a liquid crystal display (LCD) or an electro-luminescent (EL) display and a driver that outputs to the display panel drive signals corresponding to the type of the display panel based on control signals from the microcomputer 101. The display 106 displays, for example, the state of the parent terminal 100 and the like.

The operation receiver 107 receives an input operation from the user and outputs to the microcomputer 101 an electric signal corresponding to the input operation. For example, as the operation receiver 107, a touch sensor may be superimposed on the display panel of the display 106 to constitute a touch panel display along with the display panel. In such a case, the touch sensor detects a contact position or a contact manner regarding a contact operation of the user to the touch sensor and outputs to the microcomputer 101 an operation signal corresponding to the detected contact position or contact manner.

Figure 3:
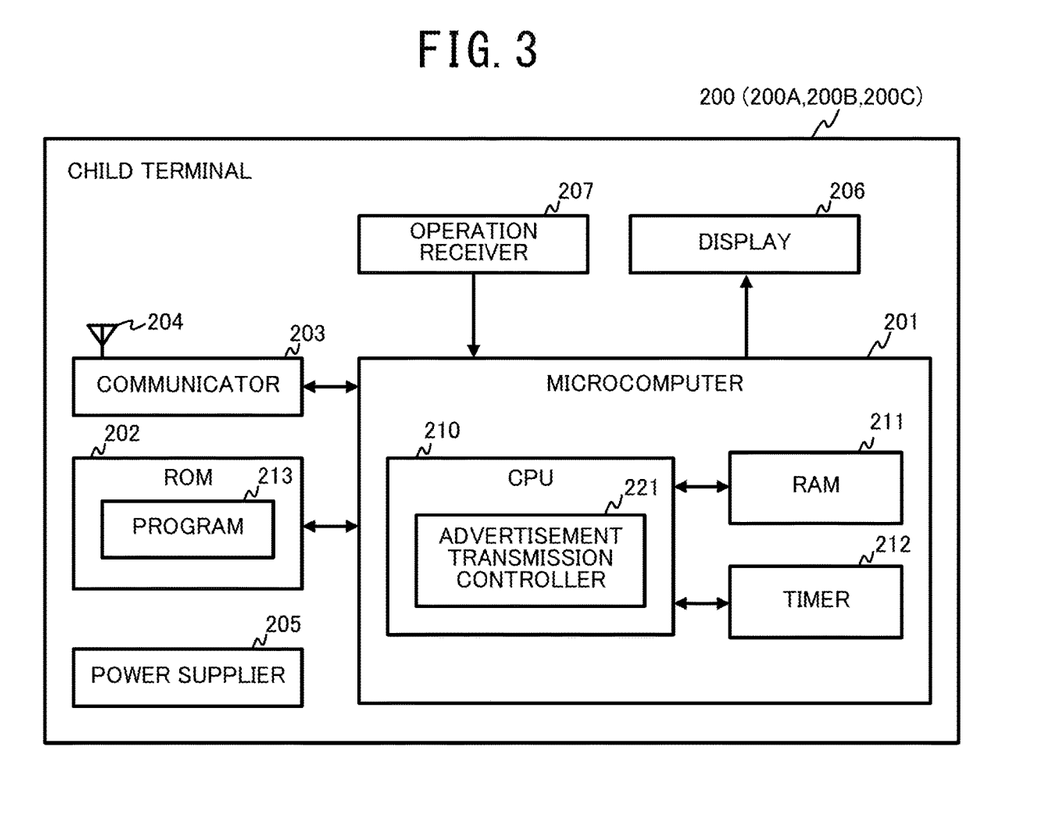
FIG. 3 is a block diagram that shows the configuration of the child terminals of the embodiment.

Next, the hardware configuration of the child terminals 200A to 200C according to the embodiment will be described. The child terminals 200A to 200C comprise, as shown in FIG. 3, a microcomputer 201, a ROM 202, a communicator 203, an antenna 204, a power supplier 205, a display 206, and an operation receiver 207.

The microcomputer 201 comprises a CPU 210 as a controller, a RAM 211 as a storage, a timer 212, and the like. Here, the RAM 211 and the timer 212 are not necessarily provided within the microcomputer 201 and may be provided outside the microcomputer 201. Moreover, the ROM 202, the communicator 203, the antenna 204, and the power supplier 205 are not necessarily provided outside the microcomputer 201 and may be provided within the microcomputer 201.

The CPU 210 is a processor that performs various arithmetic operations to collectively control the entire operation of the child terminals 200A to 200C. The CPU 210 reads control programs from the ROM 202 and loads the programs onto the RAM 211 to perform various operation processing such as arithmetic operation controls and displays regarding various functions. Moreover, the CPU 210 controls the communicator 203 to perform data communication with the parent terminal 100 and the scanner terminal 300.

The RAM 211 is a volatile memory such as a SRAM and a DRAM. The RAM 211 stores various setting data.

The timer 212 comprises an oscillation circuit, a frequency dividing circuit, a timer circuit, and the like and is capable of keeping the current time and clock-synchronizing with other communication devices.

The ROM 202 is a nonvolatile memory or the like and stores control programs and initial setting data. The control programs include a program 213 regarding control over various processing for controlling communication with the parent terminal 100 and the scanner terminal 300.

The communicator 203 comprises, for example, a radio frequency (RF) circuit, a baseband (BB) circuit, and a memory circuit. The communicator 203 demodulates, decodes, and sends to the CPU 210 radio signals that are received via the antenna 204. Moreover, the communicator 203 encodes, modulates, and transmits outside via the antenna 204 signals that are sent by the CPU 210. In this embodiment, the communicator 203 is realized by a Bluetooth controller that transmits and receives radio signals based on the BLE.

The power supplier 205 comprises, for example, a battery and a voltage conversion circuit. The power supplier 205 supplies power at an operation voltage of the parts within the child terminals 200A to 200C.

The display 206 comprises, for example, a display panel such as an LCD or an EL display and a driver that outputs to the display panel drive signals corresponding to the type of the display panel based on control signals from the microcomputer 201. The display 206 displays, for example, information that is received from the parent terminal 100, the state of the parent terminal 100, and the like.

The operation receiver 207 receives an input operation from the user and outputs to the microcomputer 201 an electric signal corresponding to the input operation. For example, as the operation receiver 207, a touch sensor may be superimposed on the display panel of the display 206 to constitute a touch panel display along with the display panel.

Figure 4:
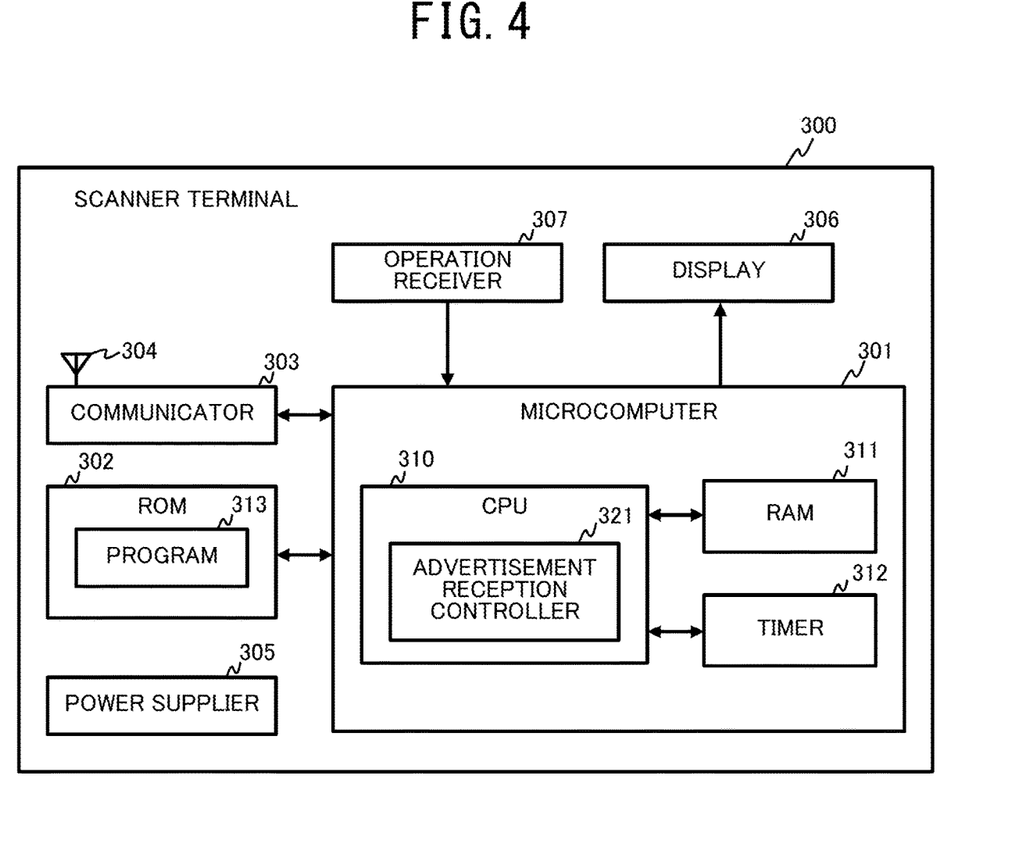
FIG. 4 is a block diagram that shows the configuration of the scanner terminal of the embodiment.

Next, the hardware configuration of the scanner terminal 300, according to the embodiment will be described. The scanner terminal 300 comprises, as shown in FIG. 4, a microcomputer 301, a ROM 302, a communicator 303, an antenna 304, a power supplier 305, a display 306, and an operation receiver 307. The scanner terminal 300 comprises, for example, a smartphone.

The microcomputer 301 comprises a CPU 310 as a controller, a RAM 311 as a storage, a timer 312, and the like. Here, the RAM 311 and the timer 312 are not necessarily provided within the microcomputer 301 and may be provided outside the microcomputer 301. Moreover, the ROM 302, the communicator 303, the antenna 304, and the power supplier 305 are not necessarily provided outside the microcomputer 301 and may be provided within the microcomputer 301.

The CPU 310 is a processor that performs various arithmetic operations that collectively control the entire operation of the scanner terminal 300. The CPU 310 reads control programs from the ROM 302 and loads the programs onto the RAM 311 to perform various operation processing such as arithmetic operation controls and displays regarding various functions. Moreover, the CPU 310 controls the communicator 303 to perform data communication with the parent terminal 100, and the child terminals 200A to 200C.

The RAM 311 is a volatile memory such as a SRAM and a DRAM. The RAM 311 stores temporary data and stores various setting data.

The timer 312 comprises an oscillation circuit, a frequency dividing circuit, a timer circuit, and the like and is capable of keeping the current time and clock-synchronizing with other communication devices.

The ROM 302 is a nonvolatile memory or the like and stores control programs and initial setting data. The control programs include a program 313 regarding control over various processing for controlling communication with the parent terminal 100 and the child terminals 200A to 200C.

The communicator 303 comprises, for example, a radio frequency (RF) circuit, a baseband (BB) circuit, and a memory circuit. The communicator 303 demodulates, decodes, and sends to the CPU 310 radio signals that are received via the antenna 304. Moreover, the communicator 303 encodes, modulates, and transmits outside via the antenna 304 signals that are sent by the CPU 310. In this embodiment, the communicator 303 is realized by a Bluetooth controller that transmits and receives radio signals based on the BLE.

The power supplier 305 comprises, for example, a battery and a voltage conversion circuit. The power supplier 305 supplies power at an operation voltage of the parts within the scanner terminal 300.

The display 306 comprises, for example, a display panel such as an LCD or an EL display and a driver that outputs to the display panel drive signals corresponding to the type of the display panel based on control signals from the microcomputer 301. The display 306 displays, for example, information that is received from the child terminals 200A to 200C.

The operation receiver 307 receives an input operation from the user and outputs to the microcomputer 301 an electric signal corresponding to the input operation. For example, as the operation receiver 307, a touch sensor may be superimposed on the display panel of the display 306 to constitute a touch panel display along with the display panel.

Next, the functional configuration of the CPU 110 of the parent terminal 100, according to the embodiment will be described. As shown in FIG. 2, the CPU 110 functions as an advertisement transmission controller 121. The function of the advertisement transmission controller 121 may be realized by a processor other than the microcomputer 101, such as the CPU of the communicator 103 or the like.

The CPU 110 as the advertisement transmission controller 121 controls the communicator 103 to connect to the child terminals 200A to 200C, periodically transmit information regarding periodic advertising (PA information) that is transmission information of the child terminals 200A to 200C, data that is scheduled to be transmitted by the child terminals 200A to 200C, and a synchronizing signal to the child terminals 200A to 200C, and synchronize with the child terminals 200A to 200C. The PA information includes data equivalent to data "sync info" that is transmitted in an advertisement packet of the type "AUX_ADV_IND" in the ordinary periodic advertising sequence. Moreover, the CPU 110 controls the communicator 103 to transmit PA information of the child terminals 200A to 200C to the scanner terminal 300 using an advertisement packet of the type "ADV_NONCONN_IND."

For example, the CPU 110 executes setting to specify the type of an advertisement packet to transmit, the timing of the advertisement packet (transmission interval), and information to be carried in the advertisement packet. Here, the CPU 110 sets "ADV_NONCONN_IND" as the type of the advertisement packet. The "ADV_NONCONN_IND" is an advertisement packet type for transmitting information including PA information to an unspecified number of devices without establishing connection. As a result, the communicator 103 broadcasts, for each of the child terminals 200A to 200C, an advertisement packet of the type "ADV_NONCONN_IND" to the scanner terminal 300 with the set timing. Here, the BLE uses 40 channels for communication that are obtained by dividing a frequency band from 2.4 GHz to 2.48 GHz by 2 MHz. These 40 channels are numbered "0" to "39." Among them, "0" to "36" are used for data communication and "37" to "39" are used for transmission/reception of advertisement packets. Hereafter, "37" to "39" are referred to as "primary channels" and "0" to "36" are referred to as "secondary channels." Thus, the communicator 103 broadcasts an advertisement packet using a "primary channel" with a set timing.

Figure 5:
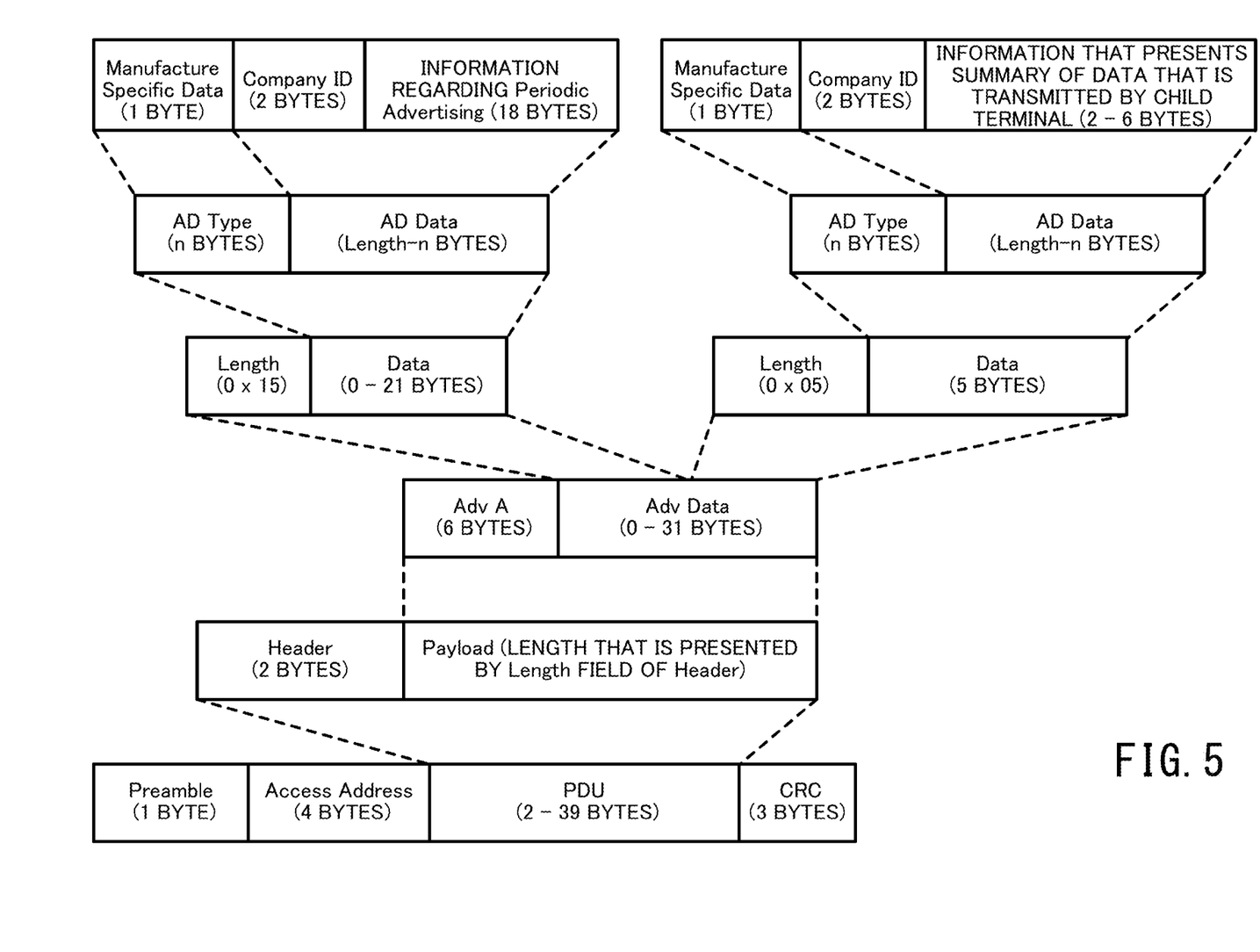
FIG. 5 is a diagram that shows an exemplary structure of an advertisement packet.

In an exemplary structure of the advertisement packet according to this embodiment, as shown in FIG. 5, the protocol data unit (PDU) of an advertisement packet in the link layer has a size of 2 to 39 bytes including a header of two bytes (Header) and a payload of up to 37 bytes (Payload). The advertisement packet type "ADV_NONCONN_IND" is specified in the header. Furthermore, the payload includes an advertiser address of six bytes (Adv A) that presents the address of the parent terminal 100 and an advertising data of up to 31 bytes (Adv Data). The size of the advertising data is up to 31 bytes according to the restriction on the payload of a single packet. The advertising data include a set of a length (Length) and data (Data). The data each include an AD Type and an AD Data. Each AD Type presents the type of the AD Data and is "Manufacture Specific Data." When the AD Type is "Manufacturer Specific Data," this means that the AD Data is data that is prescribed by the company on a freely-determined basis. The AD Data can include a "Company ID" for identifying the company and any data. One of the AD Data includes a "Company ID" of two bytes and PA information of 18 bytes. The other AD Data include a "Company ID" of two bytes and information of two to six bytes that presents a summary of data that is transmitted by the child terminals 200A to 200C.

Figure 6:
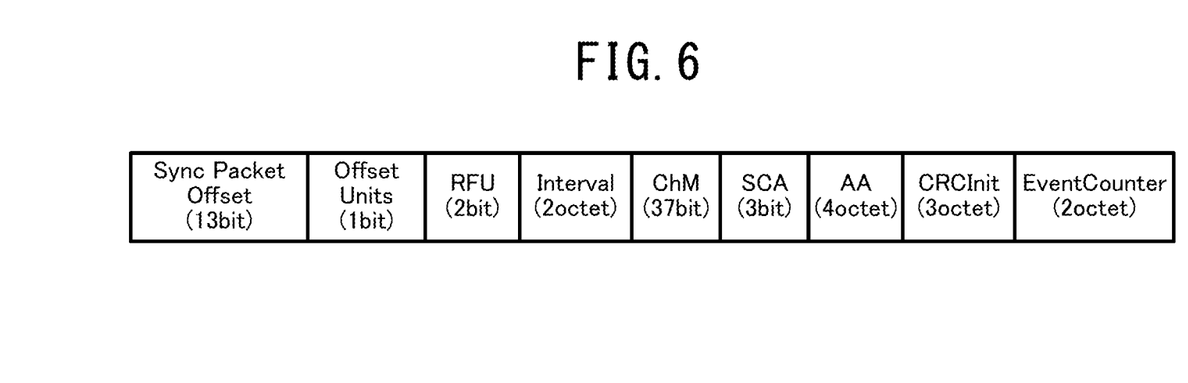
FIG. 6 is a diagram that shows an exemplary structure of information regarding the periodic advertising.

The PA information includes, as shown in FIG. 6, a sync packet offset (Sync Packet Offset), offset units (Offset Units), a reserved for future use (RFU), an interval (Interval), a channel map (ChM), a sleep clock accuracy (SCA), an access address (AA), a cyclic redundancy check initialization value (CRCInit), and an event counter (Event Counter). The sync packet offset and the offset units present the timing with which the next advertisement packet of the type "AUX_SYNC_IND" is transmitted. Multiplied by 1.25 ms, the interval presents the time interval between the start of "periodic advertisement" and the next start packet. The ChM and the event counter present a channel of the "secondary channels" to be used. A channel of the "secondary channels" is calculated with a "channel selection algorithm #2" using the ChM and the event counter. A "secondary channel" may be presented using a "channel index" in place of the ChM and the event counter. It is preferable that the PA information includes a different channel or a different timing for each of the child terminals 200A to 200C. As a result, advertisement packets are transmitted by the child terminals 200A to 200C on different channels or with different timings, thereby preventing crosstalk.

Next, the functional configuration of the CPU 210 of the child terminals 200A to 200C according to the embodiment will be described. As shown in FIG. 3, the CPU 210 functions as an advertisement transmission controller 221. The function of the advertisement transmission controller 221 may be realized by a processor other than the microcomputer 201, such as the CPU of the communicator 203.

The CPU 210 as the advertisement transmission controller 221 controls the communicator 203 to connect to the parent terminal 100, receive PA information, data that is transmitted by the child terminals 200A to 200C, and a synchronizing signal, which are periodically transmitted by the parent terminal 100, and synchronize with the parent terminal 100. The PA information includes, as described above, data equivalent to data "sync info" that is transmitted in an advertisement packet of the type "AUX_ADV_IND" in the ordinary periodic advertising sequence. Next, the CPU 210 updates the PA information that is stored in the RAM 211 based on the received PA information. Next, the CPU 210 broadcasts an advertisement packet on a "secondary channel" and with a timing that are set from the PA information that is stored in the RAM 211. The type of the advertisement packet that is transmitted here includes "AUX_SYNC_IND" and "AUX_CHAIN_IND." The "AUX_SYNC_IND" and the "AUX_CHAIN_IND" indicate an extended advertisement packet. In detail, first, the "AUX_SYNC_IND" is used for transmission, and the "AUX_CHAIN_IND" is used to transmit subsequent data that were not transmitted by the "AUX_SYNC_IND" alone. For transmitting the subsequent data in the "AUX_CHAIN_IND" following the "AUX_SYNC_IND" (and "AUX_CHAIN_IND"), a more Data bit in the advertisement packet is set to 1.

Next, the functional configuration of the CPU 310 of the scanner terminal 300 according to the embodiment will be described. As shown in FIG. 4, the CPU 310 functions as an advertisement reception controller 321. The function of the advertisement reception controller 321 may be realized by a processor other than the microcomputer 301, such as the CPU of the communicator 303.

The CPU 310 as the advertisement reception controller 321 controls the communicator 303 to receive an advertisement packet of the type "ADV_NONCONN_IND" that is broadcast by the parent terminal 100. Then, the CPU 310 saves in the RAM 311 information that presents a summary of data that is transmitted by the child terminals 200A to 200C and PA information that are included in this advertisement packet of the type "ADV_NONCONN_IND." Then, making reference to the information that presents a summary of data that is transmitted by the child terminals 200A to 200C and if desired information is included, the CPU 310 controls the communicator 303 to receive an advertisement packet that is transmitted by the child terminals 200A to 200C on a "secondary channel" and with a timing that are specified by the PA information. The type of the advertisement packet that is received here includes "AUX_SYNC_IND" and "AUX_CHAIN_IND."

For example, the CPU 310 first executes setting for receiving an advertisement packet. Then, the communicator 303 receives an advertisement packet of the type "ADV_NONCONN_IND" that is transmitted by the parent terminal 100 using a "primary channel." Subsequently, the CPU 310 makes reference to information that is included in the advertisement packet of the type "ADV_NONCONN_IND" and presents a summary of data that is transmitted by the child terminals 200A to 200C. If desired information is included, the CPU 310 receives an advertisement packet of the type "AUX_SYNC_IND" that is transmitted by the child terminals 200A to 200C using a "secondary channel" and with a timing that is specified by the PA information and saves the received data in the RAM 311. If the more Data bit in the advertisement packet of the type "AUX_SYNC_IND" is set to 1, the CPU 310 further receives an advertisement packet of the type "AUX_CHAIN_IND" and saves the received data in the RAM 311. Receiving an advertisement packet, the communicator 303 outputs to the CPU 310 an advertisement notice that indicates that an advertisement packet is received. Then, receiving an advertisement notice from the communicator 303, the CPU 310 acquires and displays data of the received advertisement packet on the display 306.

Figure 7:
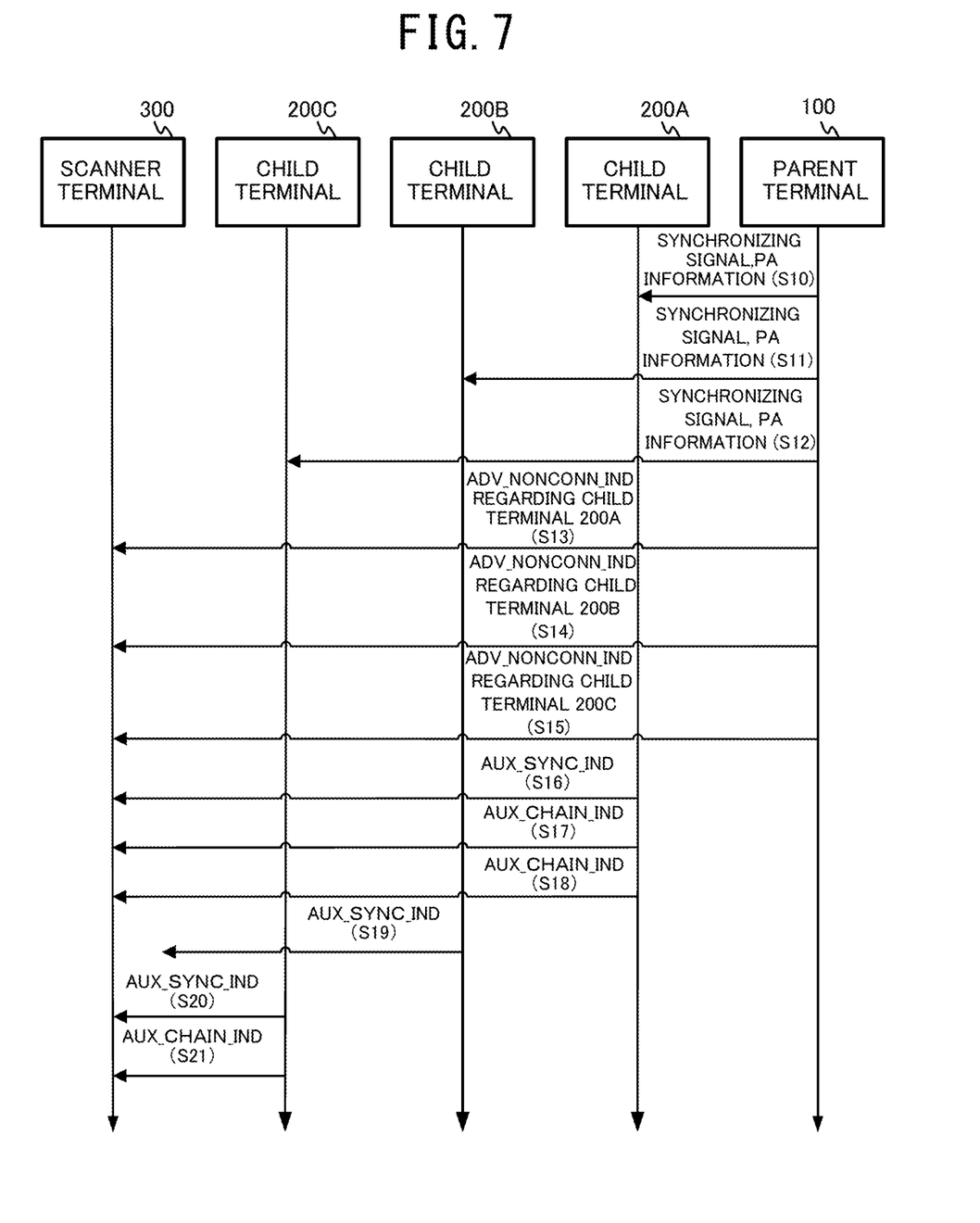
FIG. 7 is a sequence chart that shows an example of the advertising operation of the communication system in the embodiment.

Next, operation of the communication system 1 in this embodiment will be described. FIG. 7 is a sequence chart that shows an example of the advertising operation of the communication system 1 in this embodiment. In the example shown in FIG. 7, operations of the parent terminal 100, the child terminals 200A to 200C, and the scanner terminal 300 are described.

First, the parent terminal 100 connects to the child terminals 200A to 200C. Subsequently, the parent terminal 100 transmits a synchronizing signal and PA information to the child terminal 200A (Step S10). This PA information includes a "secondary channel" and a timing for the child terminal 200A to broadcast an advertisement packet. Subsequently, the parent terminal 100 transmits a synchronizing signal and PA information to the child terminal 200B (Step S11). This PA information includes a "secondary channel" and a timing for the child terminal 200B to broadcast an advertisement packet. Subsequently, the parent terminal 100 transmits a synchronizing signal and PA information to the child terminal 200C (Step S12). This PA information includes a "secondary channel" and a timing for the child terminal 200C to broadcast an advertisement packet.

Next, the parent terminal 100 broadcasts an advertisement packet of the type "ADV_NONCONN_IND" regarding the child terminal 200A (Step S13). This advertisement packet includes information that presents a summary of data that is transmitted by the child terminal 200A and PA information. This PA information includes a "secondary channel" and a timing of an advertisement packet that is broadcast by the child terminal 200A. Next, the parent terminal 100 broadcasts an advertisement packet of the type "ADV_NONCONN_IND" regarding the child terminal 200B (Step S14). This advertisement packet includes information that presents a summary of data that is transmitted by the child terminal 200B and PA information. This PA information includes a "secondary channel" and a timing of an advertisement packet that is broadcast by the child terminal 200B. Next, the parent terminal 100 broadcasts an advertisement packet of the type "ADV_NONCONN_IND" regarding the child terminal 200C (Step S15). This advertisement packet includes information that presents a summary of data that is transmitted by the child terminal 200C and PA information. This PA information includes a "secondary channel" and a timing of an advertisement packet that is broadcast by the child terminal 200C. The scanner terminal 300 receives the advertisement packets that are broadcast in the Steps S13 to S15. Here, the scanner terminal 300 is described on the assumption that information that presents a summary of data that is transmitted by the child terminal 200A and information that presents a summary of data that is transmitted by the child terminal 200C include desired information.

Next, the child terminal 200A broadcasts an advertisement packet of the type "AUX_SYNC_IND" based on the "secondary channel" and the timing that are included in the PA information that is transmitted by the parent terminal 100 (Step S16). Here, the explanation is made on the assumption that the child terminal 200A broadcasts an advertisement packet of the type "AUX_SYNC_IND" and subsequently, two advertisement packets of the type "AUX_CHAIN_IND." Next, the child terminal 200A broadcasts two advertisement packets of the type "AUX_CHAIN_IND" based on the "secondary channel" and the timing that are included in the PA information that is transmitted by the parent terminal 100 (Step S17 and Step S18). Since the information that is included in the advertisement packet that is broadcast by the parent terminal 100 and presents a summary of data that is transmitted by the child terminal 200A includes desired information, the scanner terminal 300 receives the advertisement packets that are transmitted in the Steps S16 to S18 based on the "secondary channel" and the timing that are included in the PA information that is transmitted by the parent terminal 100.

Next, the child terminal 200B broadcasts an advertisement packet of the type "AUX_SYNC_IND" based on the "secondary channel" and the timing that are included in the PA information that is transmitted by the parent terminal 100 (Step S19). Since the information that is included in the advertisement packet that is broadcast by the parent terminal 100 and presents a summary of data that is transmitted by the child terminal 200B does not include desired information, the scanner terminal 300 does not receive the advertisement packet that is transmitted in the Step S19.

Next, the child terminal 200C broadcasts an advertisement packet of the type "AUX_SYNC_IND" based on the "secondary channel" and the timing that are included in the PA information that is transmitted by the parent terminal 100 (Step S20). Here, the explanation is made on the assumption that the child terminal 200C broadcasts an advertisement packet of the type "AUX_SYNC_IND" and subsequently, an advertisement packet of the type "AUX_CHAIN_IND." Next, the child terminal 200C broadcasts an advertisement packet of the type "AUX_CHAIN_IND" based on the "secondary channel" and the timing that are included in the PA information that is transmitted by the parent terminal 100 (Step S21). The scanner terminal 300 receives the advertisement packets that are transmitted in the Steps S20 to S21 as in the Steps S16 to S18.

Figure 8:
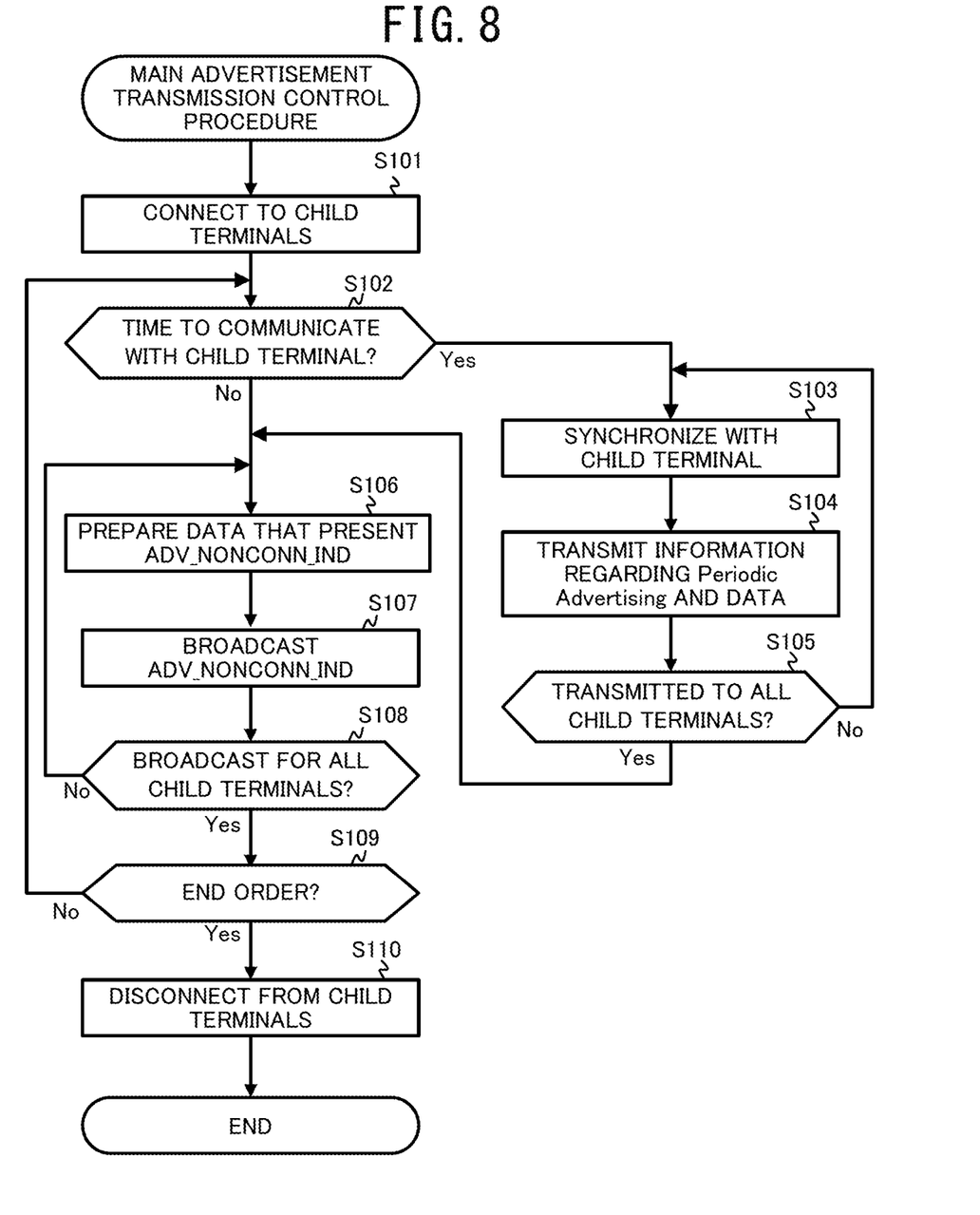
FIG. 8 is an exemplary flowchart that shows the process flow of the main advertisement transmission control procedure that is executed by the CPU of the parent terminal in the embodiment.

Next, operation of the parent terminal 100 according to this embodiment will be described in detail. FIG. 8 is an exemplary flowchart that shows the process flow of the main advertisement transmission control procedure that is executed by the CPU 110 of the parent terminal 100 in this embodiment. Triggered by, for example, a user operation, a given time interval, or a given date/time, the CPU 110 starts this procedure.

First, the CPU 110 connects to the child terminals 200A to 200C (Step S101). It may be possible that a list of address information and the like of the child terminals 200 that are necessary for connection is created and pre-stored in the ROM 102 or that the child terminals 200 broadcast information that presents their connectivity and the parent terminal 100 receives the information to acquire, create, and store in the RAM 111 a list of address information and the like of the child terminals 200 to connect. Then, the CPU 110 acquires the number of child terminals 200 to connect from the address information and the like of the child terminals 200. Then, the CPU 110 determines whether it is time to communicate with the child terminals 200A to 200C (Step S102). Whether it is time to communicate is determined based on whether it is the start of this procedure or whether a given time has elapsed since last transmission to the child terminals 200A to 200C.

If it is time to communicate with the child terminals 200A to 200C (Step S102; Yes), the CPU 110 transmits a synchronizing signal and synchronizes with the child terminals 200A to 200C (Step S103). Then, the CPU 110 transmits PA information and data that are scheduled to be transmitted by the child terminal 200A (Step S104). The PA information includes a "secondary channel" and a timing of an advertisement packet that is transmitted by the child terminals 200A to 200C. Next, the CPU 110 determines whether the transmission is done to all child terminals 200A to 200C (Step S105). If determined that the transmission is not done to all child terminals 200A to 200C (Step S105; No), processing by the CPU 110 returns to the Step S103, synchronizes with the remaining child terminals 200A to 200C (Step S103) and transmits PA information (Step S104).

If determined that the transmission is done to all child terminals 200A to 200C (Step S105; Yes), the CPU 110 prepares data that present an advertisement packet of the type "ADV_NONCONN_IND" for any one of the child terminals 200A to 200C (Step S106). An advertisement packet of the type "ADV_NONCONN_IND" includes information that presents a summary of data that is transmitted by any one of the child terminals 200A to 200C and PA information. Next, the CPU 110 broadcasts the advertisement packet of the type "ADV_NONCONN_IND" (Step S107). Next, the CPU 110 determines whether an advertisement packet of the type "ADV_NONCONN_IND" is broadcast for each of the child terminals 200A to 200C (Step S108). If determined that not all advertisement packets of the child terminals 200A to 200C are broadcast (Step S108; No), processing by the CPU 110 returns to the Step S106, prepares data that present an advertisement packet for any one of the remaining child terminals 200A to 200C (Step S106), and broadcasts the advertisement packet (Step S107).

If determined that the advertisement packets of the type "ADV_NONCONN_IND" of all child terminals 200A to 200C are transmitted (Step S108; Yes), the CPU 100 determines whether an end order is given by a user operation or elapse of a given time (Step S109). If no end order is given (Step S109; No), processing by the CPU 110 returns to the Step S102 and repeats the Steps S102 to S109. If an end order is given (Step S109; Yes), the CPU 110 disconnects communication with the child terminals 200A to 200C (Step S110) and ends this procedure.

Figure 9:
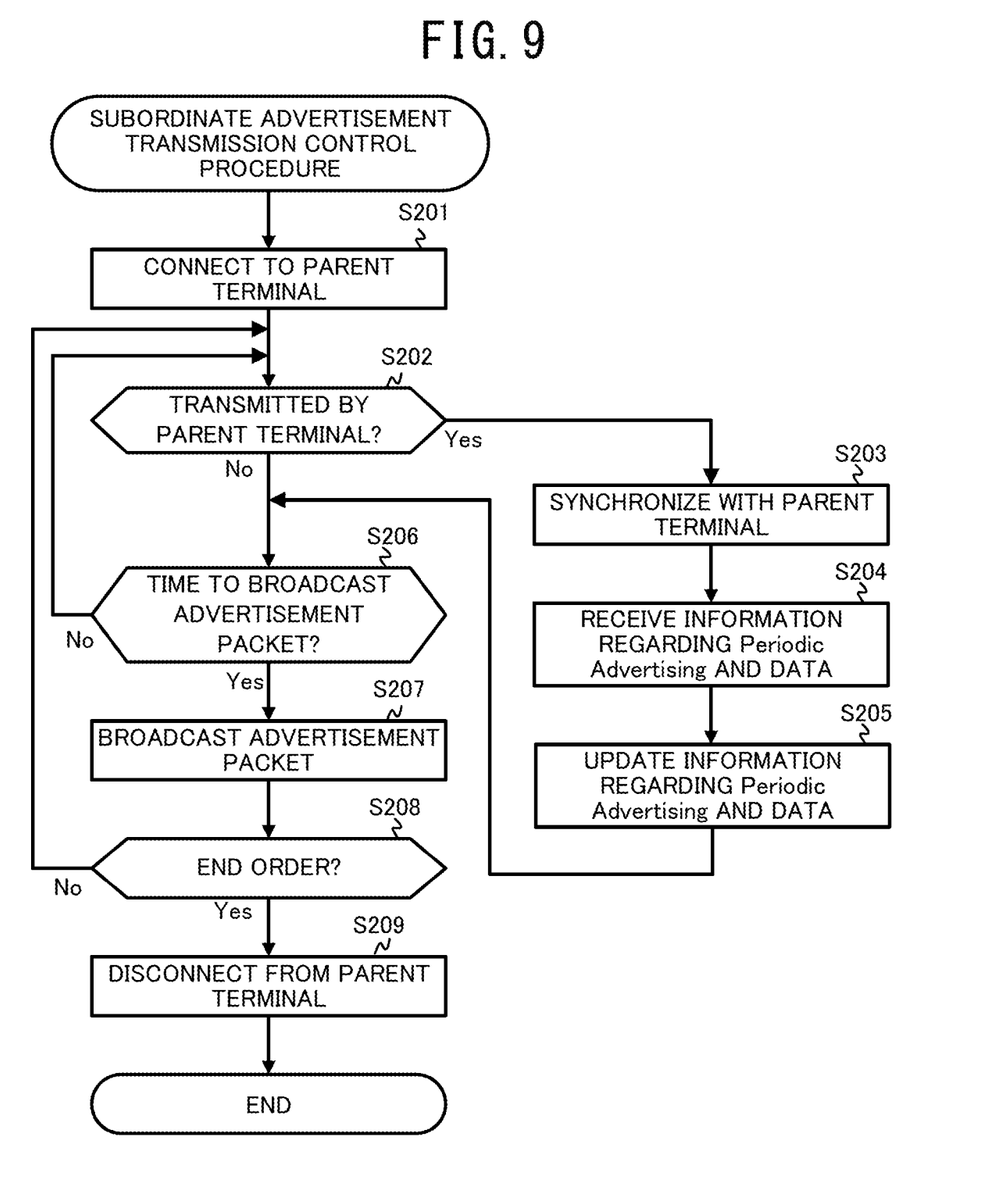
FIG. 9 is an exemplary flowchart that shows the process flow of the subordinate advertisement transmission control procedure that is executed by the CPU of a child terminal in the embodiment.

Next, operation of the child terminals 200A to 200C according to this embodiment will be described in detail. FIG. 9 is an exemplary flowchart that shows the process flow of the subordinate advertisement transmission control procedure that is executed by the CPU 210 of the child terminals 200A to 200C in this embodiment. Triggered by, for example, a user operation, a given time interval, or a given date/time, the CPU 210 starts this procedure.

First, the CPU 210 connects to the parent terminal 100 (Step S201). Then, the CPU 210 determines whether a synchronizing signal and PA information are transmitted by the parent terminal 100 (Step S202). If the CPU 210 determines that a synchronizing signal and PA information are transmitted by the parent terminal 100 (Step S202; Yes), the CPU 210 synchronizes with the parent terminal 100 (Step S203) and receives the PA information and data that are scheduled to be transmitted by the child terminal 200A (Step S204). The PA information includes a "secondary channel" and a timing of an advertisement packet that is transmitted by the child terminal 200A. Next, the CPU 210 updates PA information and data that are scheduled to be transmitted by the child terminal 200A that are stored in the RAM 211 (Step S205). If no synchronizing signal and PA information are transmitted by the parent terminal 100 (Step S202; No), the CPU 210 proceeds to Step S206.

Next, the CPU 210 determines whether it is time to broadcast an advertisement packet (Step S206). Whether it is time to broadcast is determined based on the synchronizing signal and the timing that is included in the PA information that are transmitted by the parent terminal 100. If determined that it is not a time to broadcast an advertisement packet (Step S206; No), processing by the CPU 210 returns to the Step S202.

If determined that it is time to broadcast an advertisement packet (Step S206; Yes), the CPU 210 broadcasts an advertisement packet (Step S207). This advertisement packet is transmitted based on the "secondary channel" and the timing that are included in the PA information that is stored in the RAM 211. The type of the advertisement packet that is transmitted here includes "AUX_SYNC_IND" and "AUX_CHAIN_IND." Next, the CPU 210 determines whether an end order is given by a user operation or elapse of a given time (Step S208). If no end order is given (Step S208; No), processing by the CPU 210 returns to the Step S202 and repeats the Steps S202 to S208. If an end order is given (Step S208; Yes), the CPU 210 disconnects communication with the parent terminal 100 (Step S209) and ends this procedure.

Figure 10:
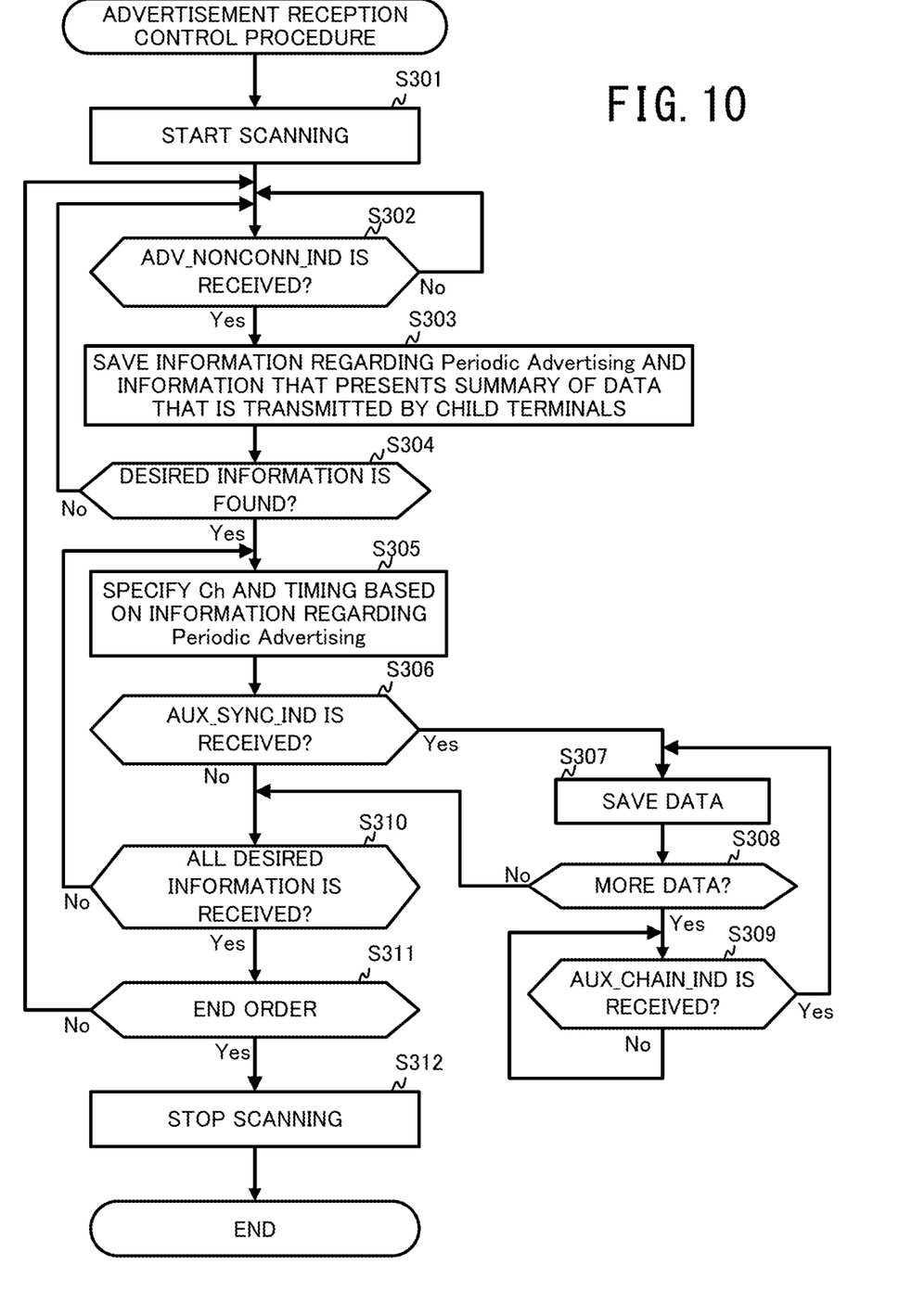
FIG. 10 is an exemplary flowchart that shows the process flow of the advertisement reception control procedure that is executed by the CPU of the scanner terminal in the embodiment.

Next, operation of the scanner terminal 300 according to this embodiment will be described in detail. FIG. 10 is an exemplary flowchart that shows the process flow of the advertisement reception control procedure that is executed by the CPU 310 of the scanner terminal 300 in this embodiment. Triggered by, for example, a user operation, the CPU 310 starts this procedure.

The CPU 310 of the scanner terminal 300 scans for advertisements (Step S301). Then, the CPU 310 determines whether an advertisement of the type "ADV_NONCON-N_IND" is received from the communicator 303 (Step S302). The CPU 310 waits until an advertisement is received (Step S302; No).

If an advertisement of the type "ADV_NONCON-N_IND" is received (Step S302; Yes), the CPU 310 saves in the RAM 311 PA information and information that presents a summary of data that is transmitted by the child terminals 200A to 200C that are included in the advertisement (Step S303). Next, the CPU 310 determines whether desired information is found in the information that presents a summary of data that are transmitted by the child terminals 200A to 200C and stored in the RAM 311 (Step S304). Whether desired information is found is determined based on whether the information that presents a summary of data is information that matches desired information that is presaved in the RAM 311. If desired information is not found (Step S304; No), processing by the CPU 310 returns to the Step S302.

If desired information is found (Step S304; Yes), the CPU 310 specifies a "secondary channel" and a timing based on the PA information that is saved in the RAM 311 (Step S305). Next, the CPU 310 determines whether an advertisement packet of the type "AUX_SYNC_IND" is received (Step S306). If no advertisement packet of the type "AUX_SYNC_IND" is received (Step S306; No), the CPU 310 determines whether all desired information is received (Step S310). If an advertisement packet of the type "AUX_SYNC_IND" is received (Step S306; Yes), the CPU 310 saves in the RAM 311 data that are included in this advertisement packet (Step S307). The data that are saved in the RAM 311 are displayed on the display 306. The CPU 310 determines whether there are more data (Step S308). Whether there is more data is determined based on whether the mode Data bit in the advertisement packet acquired in Step S306 or Step S309 is set to 1. If there are more data (Step S308; Yes), the CPU 310 determines whether an advertisement packet of the type "AUX_CHAIN_IND" is received (Step S309). The CPU 310 waits until an advertisement packet is received (S309; No). If an advertisement packet of the type "AUX_CHAIN_IND" is received (Step S309; Yes), the CPU 310 saves in the RAM 311 data that are included in this advertisement packet (Step S307). The data that are saved in the RAM 311 are displayed on the display 306.

If there are no more data (Step S308; No), the CPU 310 determines whether all desired information is received (Step S310). Whether all desired information is received is determined by specifying, from the information that presents a summary of data that is transmitted by the child terminals 200A to 200C and is saved in the Step S303, the child terminals 200A to 200C that transmit information that matches desired information that is presaved in the RAM 311 and determining whether reception from all specified child terminals 200A to 200C is completed. If not all desired information is received (Step S310; No), processing by the CPU 310 returns to the Step S305. If all desired information is received (Step S310; Yes), the CPU 310 determines whether an end order is given by a user operation (Step S311). If no end order is given (Step S311; No) processing by, the CPU 310 returns to the Step S302 and repeats the Steps S302 to S311. If an end order is given (Step S311; Yes), the CPU 310 stops scanning for advertisements (Step S312) and ends this procedure.

As described above, in the communication system 1 according to this embodiment, the parent terminal 100 manages the "secondary channels" that are used by the child terminals 200A to 200C, the parent terminal 100 transmits a synchronizing signal and PA information to the child terminals 200A to 200C, and the child terminals 200A to 200C do not use the "primary channels," whereby it is possible to prevent crosstalk between a "primary channel" and a "secondary channel." Moreover, the parent terminal 100 transmits an advertisement of the type "ADV_NONCON-N_IND" to the scanner terminal 300, whereby the child terminals 200A to 200C can omit transmission of advertisement packets of the types "ADV_EXT_IND" and "AUX_ADV_IND" in performing the periodic advertising, which can reduce the power consumption of the child terminals 200A to 200C. Moreover, the parent terminal 100 manages advertising on the "primary channels" for receiving the periodic advertising, whereby crosstalk is unlikely to occur. Therefore, it is possible to prevent deterioration in the probability of reception at the scanner terminal 300, even where there are many terminals around that perform the periodic advertising. Thus, the communication system 1 according to this embodiment can reduce the power consumption of the child terminals 200A to 200C that perform the periodic advertising and prevent deterioration in the probability of reception of the periodic advertising at the scanner terminal 300.

Here, the above embodiment is not restrictive, and various modifications are available.

For example, the above embodiment is described with regard to the case in which the communication system 1 has three child terminals. The communication system 1 has only to have a child terminal, and may have two child terminals or may have four or more child terminals.

The above embodiment is described with regard to the case in which the parent terminal 100 sequentially transmits an advertisement packet of the type "ADV_NONCONN_IND" for the child terminals 200A to 200C. It may be possible to prioritize the child terminals 200A to 200C by changing the length of time, the transmission frequency, or the transmission order in transmitting an advertisement packet of the type "ADV_NONCONN_IND" for the child terminals 200A to 200C. In this way, it is possible to advertise important data preferentially.

Figure 11:
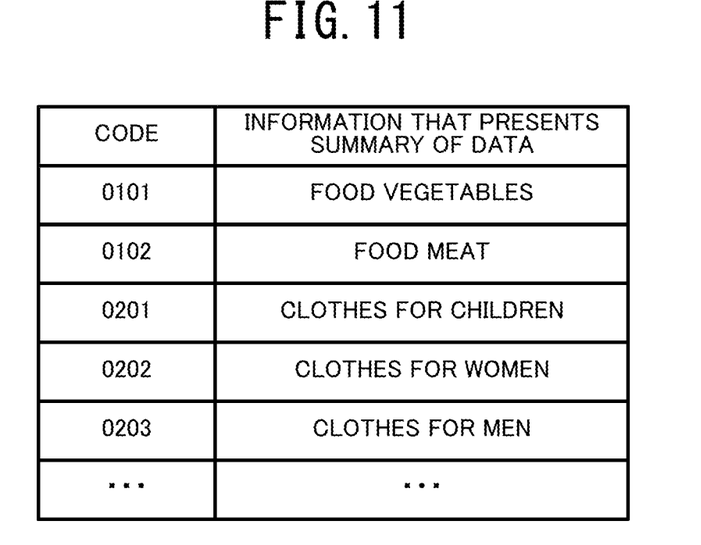
FIG. 11 is an exemplary table that shows the relationship between codes and summaries of data that are transmitted by the child terminals according to a modified embodiment.
Figure 12:
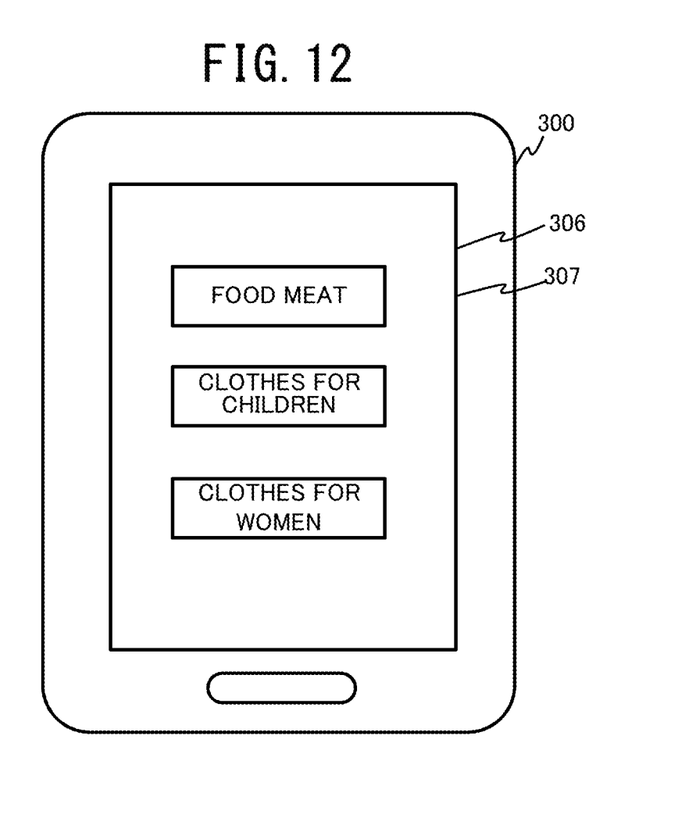
FIG. 12 is an illustration that shows the display of the scanner terminal according to the modified embodiment.

The above embodiment is described with regard to the case in which the parent terminal 100 broadcasts an advertisement packet of the type "ADV_NONCONN_IND" inclusive of information that presents a summary of data that is transmitted by the child terminals 200A to 200C. The information that presents a summary of data may be a code to which the information that presents a summary of data is converted as shown in FIG. 11. In this way, the data transmission volume can be reduced. In such a case, the scanner terminal 300 prestores in the ROM 302 a table in which the codes and the information that presents summaries are associated. Receiving an advertisement packet of the type "ADV_NONCONN_IND," the scanner terminal 300 converts the code to information that presents a summary of data and displays the information on the display 306, as shown in FIG. 12. At this point, it may be possible that the user selects desired information from the displayed information that presents summaries of data and enters the information into the operation receiver 307 and the above-described determination in the Step S304 of the advertisement reception control procedure is performed based on the entered information that presents a summary of data. Moreover, it may be possible to prestore in the ROM 302 desired information of the user and perform the above-described determination in the Step S304 of the advertisement reception control procedure based on whether the information is related to the desired information of the user. Moreover, it may be possible to prestore in the ROM 302 information that presents the age and the gender of the user and perform the above-described determination in the Step S304 of the advertisement reception control procedure based on whether the information is related to the age and the gender of the user.

Moreover, the parent terminal 100 may broadcast an advertisement packet with the PA information exclusive of information that presents a summary of data that is transmitted by the child terminals 200A to 200C. In such a case, the scanner terminal 300 receives all advertisement packets that are broadcast by the child terminals 200A to 200C. Moreover, the parent terminal 100 may broadcast with the PA information inclusive of data that present the number of child terminals. In this way, the scanner terminal 300 can determine whether advertisement packets of the type "ADV_NONCONN_IND" for all child terminals are received.

Moreover, the above embodiment is described on the assumption that the parent terminal 100, the child terminals 200, and the scanner terminal 300 all comprise a timer and comprise the timer function. However, these devices may not comprise a timer as long as these devices can synchronize with each other by means of the communicator without the timer. Moreover, the above embodiment is described with regard to the case in which the parent terminal 100, the child terminals 200A to 200C, and the scanner terminal 300 communicate with each other. The parent terminal 100, the child terminals 200A to 200C, and the scanner terminal 300 can be any device as long as a communicator that transmits and receives radio signals based on the BLE is provided and may be an electronic device that comprises the communication function such as a smartphone, a cell-phone, a personal computer (PC), a personal digital assistant (PDA), an electronic clock, and a smart watch.

Moreover, the above embodiment is described on the assumption that the parent terminal 100 and the child terminals 200 are connected by near field communication. However, these devices may be wire-connected.

Moreover, in the above embodiment, the case is described in which the CPUs 110, 210, and 310 perform control operation. However, the control operation is not restricted to software control by the CPUs 110, 210, and 310. The control operation may be performed in part or in whole by a hardware configuration such as a dedicated logic circuit.

Moreover, the above description is made using, by way of example, the ROMs 102, 202, and 302 that comprise a nonvolatile memory such as a flash memory as the computer-readable medium that stores the programs 113, 213, and 313 according to the wireless control processing of the embodiment. However, the computer-readable medium is restricted to these and a portable storage medium such as a hard disk drive (HDD), a compact disc read only memory (CD-ROM), and a digital versatile disc (DVD) may be applicable.

Additionally, specific details of the configuration, the control procedure, the exemplary display, and the like that are presented in the above embodiment can be modified as appropriate without departing from the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A communication device comprising:
   a communicator that communicates with a plurality of terminals that broadcasts a plurality of advertisements to a scanner terminal that receives data from the plurality of terminals; and
   a controller that controls the communicator to transmit, to each terminal of the plurality of terminals, data that is included in one of the plurality of advertisements that is scheduled to be broadcast by the terminal and transmission information regarding transmission of the one of the plurality of advertisements by the terminal, and to broadcast the transmission information for each terminal of the plurality of terminals to the scanner terminal, wherein the transmission information, for each terminal of the plurality of terminals indicates, indicates a timing when the terminal is to transmit the one of the plurality of advertisements, and wherein the timing when the terminal is to transmit the one of the plurality of advertisements is different for each terminal of the plurality of terminals.

2. The communication device according to claim 1, wherein the transmission information further includes information indicating a channel.

3. The communication device according to claim 1, wherein the controller controls the communicator to communicate with each terminal of the plurality of terminals and synchronize with each terminal of the plurality of terminals.

4. The communication device according to claim 1, wherein the controller controls the communicator to further broadcast information that presents a summary of data that is included in the plurality of advertisements that is broadcast by the plurality of terminals.

5. A communication system comprising:
the communication device according to claim 1; and
a terminal of the plurality of terminals,
wherein the terminal includes:
a communicator that communicates with the communication device and broadcasts to the scanner terminal; and
a controller that controls the communicator to broadcast one of the plurality of advertisements based on the transmission information for the terminal that is transmitted by the communication device.

6. A communication method that is performed by a communication device that communicates with a plurality of terminals that broadcasts a plurality of advertisements to a scanner terminal that receives data from the plurality of terminals, the method comprising:

transmitting, to each terminal of the plurality of terminals, data that is included in one of the plurality of advertisements that is scheduled to be broadcast by the terminal and transmission information regarding transmission of the one of the plurality of advertisements by the terminal; and broadcasting the transmission information for each terminal of the plurality of terminals to the scanner terminal, wherein the transmission information, for each terminal of the plurality of terminals indicates, indicates a timing when the terminal is to transmit the one of the plurality of advertisements, and wherein the timing when the terminal is to transmit the one of the plurality of advertisements is different for each terminal of the plurality of terminals.

7. The communication method according to claim 6, wherein the transmission information further includes information indicating a channel.

8. The communication method according to claim 6, the method further comprising controlling the communicator to communicate with each terminal of the plurality of terminals and synchronize with each terminal of the plurality of terminals.

9. The communication method, according to claim 6, comprising:

controlling the communicator to further broadcast information that presents a summary of data that is included in the plurality of advertisements that is broadcast by the plurality of terminals.

10. A non-transitory storage medium storing a program that is readable by a computer that has a communicator for communicating with a plurality of terminals that broadcasts a plurality of advertisements and for broadcasting to a scanner terminal that receives data from the plurality of terminals, the program causing the computer to:

cause the communicator to transmit, to each terminal of the plurality of terminals, data that is included in one of the plurality of advertisements that is scheduled to be broadcast by the terminal and transmission information regarding transmission of the advertisement by the terminal; and cause the communicator to broadcast the transmission information for each terminal of the plurality of terminals to the scanner terminal, wherein the transmission information, for each terminal of the plurality of terminals indicates, indicates a timing when the terminal is to transmit the one of the plurality of advertisements, and wherein the timing when the terminal is to transmit the one of the plurality of advertisements is different for each terminal of the plurality of terminals.

11. The storage medium according to claim 10, wherein the transmission information further includes information indicating a channel.

12. The storage medium according to claim 10, wherein the program causes the computer to control the communicator to communicate with each terminal of the plurality of terminals and synchronize with each terminal of the plurality of terminal.

13. The storage medium according to claim 10, wherein the program causes the computer to control the communicator to further broadcast information that presents a summary of data that is included in the plurality of advertisements that is broadcast by the plurality of terminals.

* * * * *